(12) United States Patent
Bosse et al.

(10) Patent No.: US 10,880,571 B2
(45) Date of Patent: *Dec. 29, 2020

(54) MULTI-VIEW CODING WITH EFFECTIVE HANDLING OF RENDERABLE PORTIONS

(71) Applicant: GE VIDEO COMPRESSION, LLC, Albany, NY (US)

(72) Inventors: Sebastian Bosse, Berlin (DE); Heiko Schwarz, Panketel (DE); Thomas Wiegand, Berlin (DE); Tobias Hinz, Berlin (DE)

(73) Assignee: GE Video Compression, LLC, Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,569

(22) Filed: Aug. 22, 2019

(65) Prior Publication Data

US 2019/0379902 A1   Dec. 12, 2019

Related U.S. Application Data

(63) Continuation of application No. 15/687,920, filed on Aug. 28, 2017, now Pat. No. 10,440,385, which is a
(Continued)

(51) Int. Cl.
*H04N 19/52* (2014.01)
*H04N 19/463* (2014.01)
(Continued)

(52) U.S. Cl.
CPC ........... *H04N 19/52* (2014.11); *H04N 19/463* (2014.11); *H04N 19/553* (2014.11); *H04N 19/597* (2014.11)

(58) Field of Classification Search
None
See application file for complete search history.

(56) References Cited

U.S. PATENT DOCUMENTS

2002/0154697 A1   10/2002   Jeon
2003/0202592 A1   10/2003   Sohn et al.
(Continued)

FOREIGN PATENT DOCUMENTS

EP       1978750 A2        10/2008
KR   10-2010-0014553 A      2/2010
(Continued)

OTHER PUBLICATIONS

Official Communication issued in International Patent Application No. PCT/EP2012/072182 dated Feb. 15, 2013.
(Continued)

*Primary Examiner* — Peter D Le
(74) *Attorney, Agent, or Firm* — Morgan, Lewis & Bockius LLP

(57) ABSTRACT

A proposed intermediate way of handling the renderable portion of the first view results in more efficient coding. Instead of omitting the coding of the renderable portion completely, even more efficient coding of multi-view signals entails merely suppressing the coding of the residual signal within the renderable portion, whereas the prediction parameter coding still takes place from the non-renderable portion of the multi-view signal across the renderable portion so that prediction parameters for the renderable portion may be exploited for predicting parameters for the non-renderable portion. The additional coding rate for transmitting the prediction parameters for the renderable portion may be kept low as this merely aims at forming a continuation of the parameter history across the renderable portion to serve as a basis for prediction parameters of other portions of the multi-view signal.

20 Claims, 6 Drawing Sheets left view rendered view right view

Related U.S. Application Data continuation of application No. 14/271,481, filed on May 7, 2014, now Pat. No. 9,774,850, which is a continuation of application No. PCT/EP2012/072182, filed on Nov. 8, 2012.

(60) Provisional application No. 61/558,647, filed on Nov. 11, 2011.

(51) Int. Cl.
*H04N 19/553* (2014.01)
*H04N 19/597* (2014.01)

(56) References Cited

U.S. PATENT DOCUMENTS

| | | |
|---|---|---|
| 2003/0234859 A1 | 12/2003 | Malzbender |
| 2006/0291561 A1 | 12/2006 | Seong |
| 2007/0064800 A1 | 3/2007 | Ha |
| 2007/0109300 A1 | 5/2007 | Li |
| 2007/0147502 A1 | 6/2007 | Nakamura |
| 2008/0174594 A1 | 7/2008 | Li |
| 2009/0015662 A1 | 1/2009 | Kim |
| 2009/0103616 A1 | 4/2009 | Ho |
| 2010/0020884 A1 | 1/2010 | Pandit |
| 2010/0284466 A1 | 11/2010 | Pandit |
| 2011/0038418 A1 | 2/2011 | Pandit |
| 2011/0116547 A1 | 5/2011 | Chen |
| 2011/0142138 A1 | 6/2011 | Tian |
| 2011/0222602 A1 | 9/2011 | Sung |
| 2011/0255592 A1 | 10/2011 | Sung |
| 2011/0261050 A1 | 10/2011 | Smolic |
| 2012/0027291 A1 | 2/2012 | Shimizu |

FOREIGN PATENT DOCUMENTS

| | | |
|---|---|---|
| WO | 2008/007913 A1 | 1/2008 |
| WO | 2008/133455 A1 | 11/2008 |

OTHER PUBLICATIONS

Schwarz et al., "Description of 3D Video Technology Proposal by Fraunhofer HHI (HEVC compatible: configuration B)", 98 MPEG Meeting No. M22571, Geneva, Switzerland, Nov. 22, 2011, 46 pages.

Bartnik et al., "HEVC Extension for Multiview Video Coding and Multiview Video plus Depth Coding", 43, VCEG Meeting, San Jose, CA, No. VCEG-AR13, Feb. 4, 2012, 42 pages.

Smolic et al., "An Overview of Available and Emerging 3D Video Formats and Depth Enhanced Stereo as Efficient Generic Solution", Picture Coding Symposium 2009, May 6, 2009, 4 pages.

Martinian, Emin, et al., "View Synthesis for Multiview Video Compression," Mitsubishi Electric Research Labs, Picture Coding Symposium, Apr. 24, 2004, 5 pages.

Survey of Algorithms used for Multi-view Coding (MVC), ISO/IEC JTC1/SC29/WG11, MPEG2005/N6909, Jan. 2005, Hong Kong China, 10 pages.

Schwarz, et al., "Description of 3D Video Technology Proposal by Fraunhofer HH1 (HEVC compatible; configuration B)," ISO/IEC JTC1/SC29/WG11 MPEG2011/M22571, Nov. 2011, Geneva, Switzerland, 46 pages.

Office Action dated Aug. 25, 2016, issued in parallel U.S. Appl. No. 14/273,701, 45 pages.

Office Action dated Sep. 22, 2016 in U.S. Appl. No. 14/271,481.

Notice of Allowance dated May 26, 2017 in U.S. Appl. No. 14/271,481.

Office Action dated Oct. 18, 2017 issued in U.S. Appl. No. 14/273,701.

Office Action dated Apr. 13, 2018 in U.S. Appl. No. 14/273,701.

Konieczny et al., Depth-Based Inter-view Prediction of Motion Vectors for Improving Multiview video coding; 2010; Poznan University of Technology, pp. 1-4.

Notice of Reasons for Rejection Korean Patent Application No. 10-2018-7030649 dated Dec. 6, 2018.

Notice of Allowance dated Dec. 5, 2018 in U.S. Appl. No. 14/273,701.

Non-final Office Action U.S. Appl. No. 15/687,920 dated Jan. 25, 2019.

Extended European Search Report EP Application No. 18185225.2 dated Jan. 29, 2019.

Notice of Allowance U.S. Appl. No. 15/687,920 dated May 22, 2019.

Office Action dated May 13, 2020 in U.S. Appl. No. 16/291,146.

Office Action dated Jul. 9, 2020 in European Application 18185225.2.

Notice of Allowance dated Aug. 28, 2020 in U.S. Appl. No. 16/291,146.

MULTI-VIEW CODING WITH EFFECTIVE HANDLING OF RENDERABLE PORTIONS

CROSS-REFERENCE TO RELATED APPLICATIONS

This application is a Continuation of U.S. Ser. No. 15/687,920, filed Aug. 28, 2017, which is a Continuation of U.S. Ser. No. 14/271,481 filed May 7, 2014, now U.S. Pat. No. 9,774,850, which is a Continuation of International Application No. PCT/EP2012/072182, filed Nov. 8, 2012, which claims priority to U.S. Provisional Patent Application No. 61/558,647, filed Nov. 11, 2011. The subject matter of each of the foregoing patent applications and patents is incorporated herein by reference in its entirety.

BACKGROUND OF THE INVENTION

The present application is concerned with multi-view coding.

Multi-view video sequences are basically captured as multiple single view sequences. These single view sequences are captured by multiple cameras simultaneously from different view-points of the same scene. Therefore, multi-view video sequences contain a high amount of inter-view redundancies.

A common technique to deal with these inter-view redundancies is inter-view prediction, analogous to the well known temporal motion-compensated or inter-frame prediction. In interview prediction, the reference frame does not relate temporally but spatially (regarding the camera position) to the frame to be coded. Since these two kinds of prediction are conceptually the same, they can be easily combined by using the same reference lists for both kinds of prediction (i.e., a reference picture list can contain both temporal reference pictures as well as inter-view reference pictures).

Such a combination of temporal and inter-view prediction is used by the MVC extension to H.264/AVC.

Figure 1:
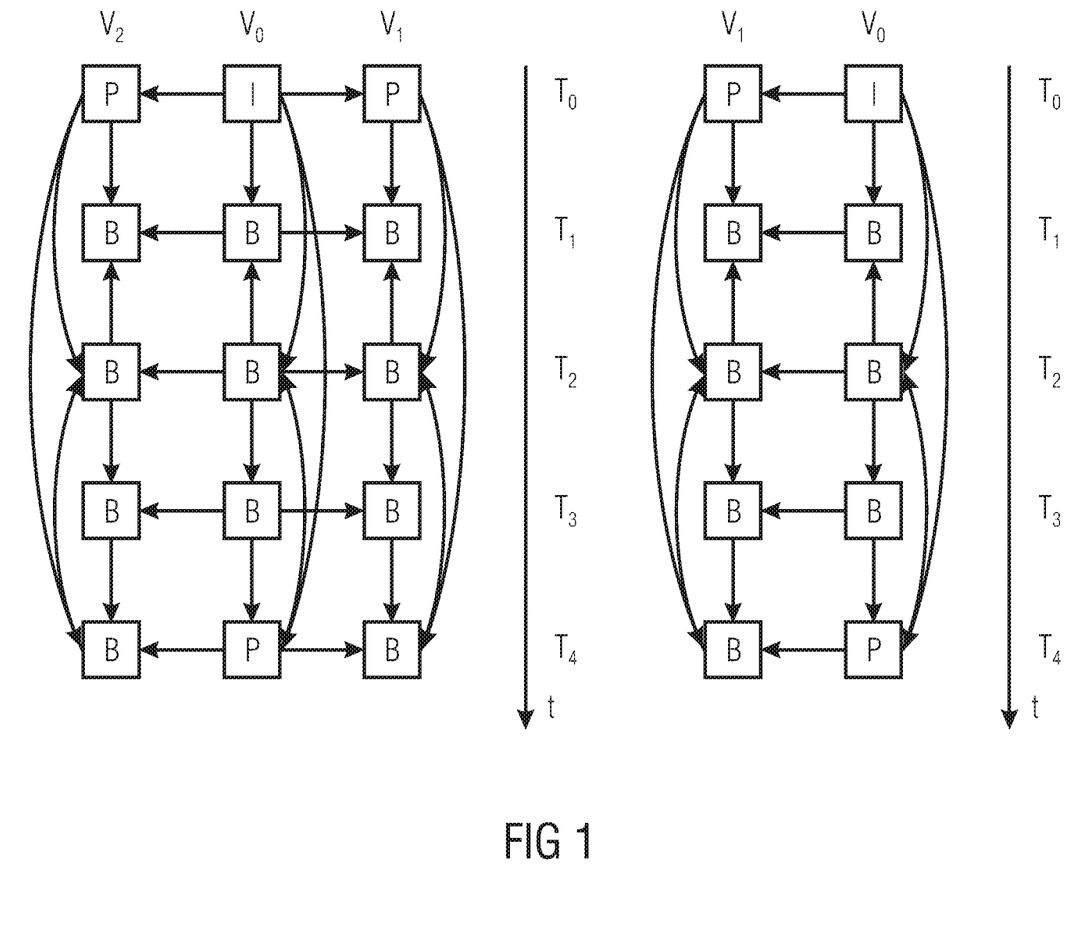
FIG. 1 shows prediction structures of a data stream coded according to the MVC extension to H.264/AVC using intra prediction, temporal prediction (vertical errors) and interview prediction (horizontal errors)

An example for an effective prediction structure combining temporal and inter-view prediction is presented in FIG. 1. On the left side, a possible prediction structure is shown for the 3 view case, on the right side, an example for the 2 view case is given. In both cases, view V.sub.0 is the reference view that is used for interview prediction.

Interview prediction, as used in MVC is a feasible technique to deal with interview redundancies if only few views are transmitted, e.g. in stereoscopic (two-view) video. The transmitted amount of data in MVC increases approximately linearly with the number of views. This makes MVC unsuitable for applications that demand a higher number of views, such as autostereoscopic displays, where 28 or more views are presented. In such a scenario, not all the views are transmitted, but only a few views, e.g. 3 views. The bigger part of the views is rendered at the decoder side using the transmitted views. In order to decrease complexity of rendering, new approaches in multi-view coding do not only encode texture (as in MVC), but also depth information in form of depth maps plus camera parameters. This provides the receiver with 3D scene information and eases the interpolation (rendering) of intermediate views.

Due to disocclusions and pixel displacements that are reaching out of the image plane, not all regions of a frame can be rendered from another view.

Figure 2:
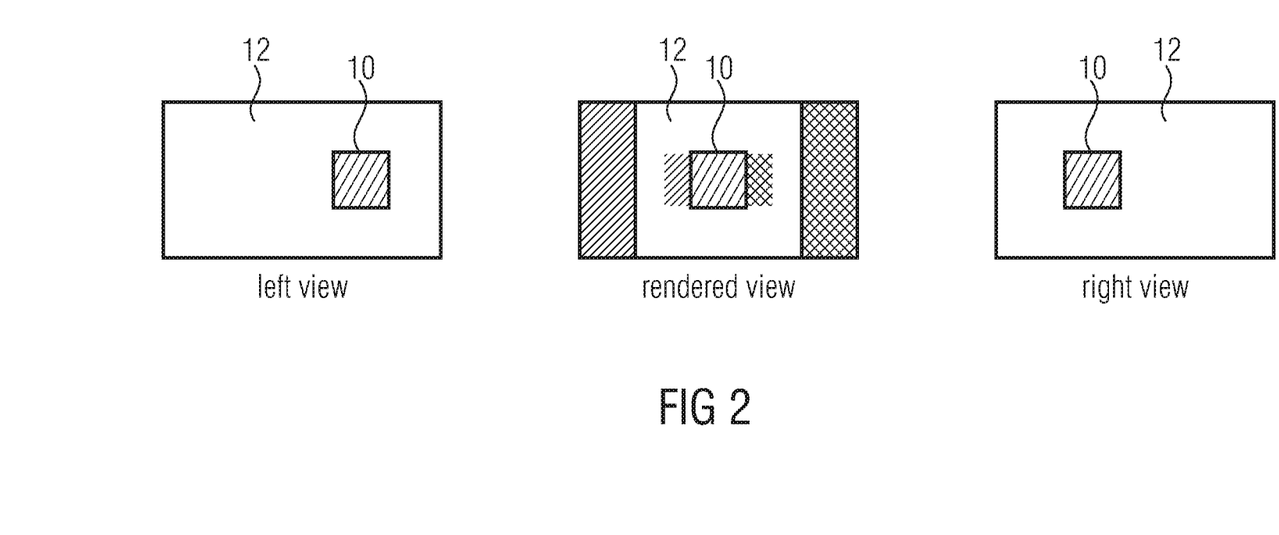
FIG. 2 shows exemplarily the rendition of an intermediate view (rendered view) from left and right views, respectively.

FIG. 2 sketches the rendering for a scene that just contains a square 10 in front of a white background (12). The right view and the left view are transmitted, the intermediate view is rendered. The regions marked hatched cannot be rendered from the right view, due to disocclusions (cross hatched with dashed lines) and pixel displacements reaching out of the image plane (cross hatched with continuous lines), while analogously the regions marked simply hatched cannot be rendered from the left view. The regions marked white, i.e. the background, and the object 10 in the rendered view are present in both (left and right) transmitted views.

Figure 3:
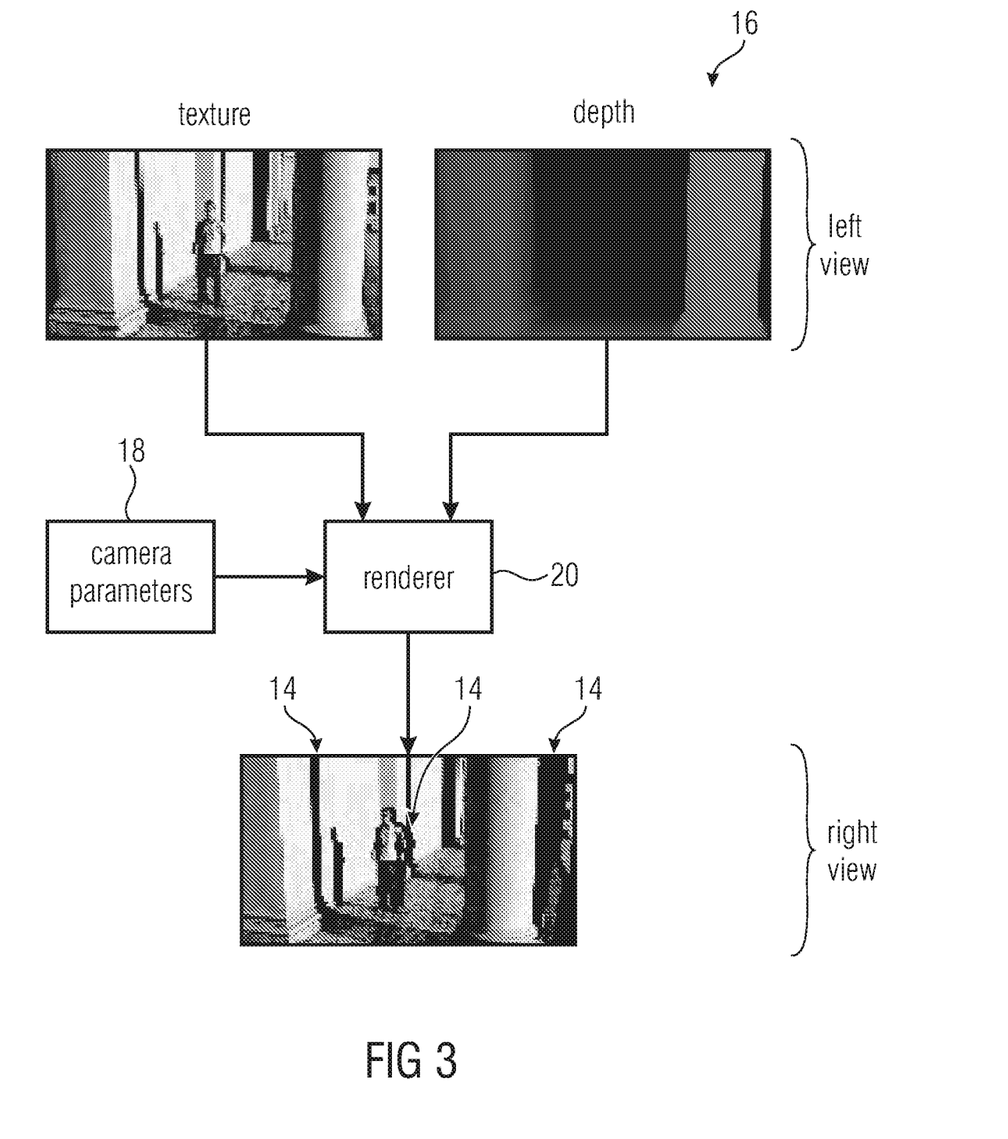
FIG. 3 shows the rendering of a transmitted dependent view (right view) from a transmitted reference view (left view)

FIG. 3 shows an example of the rendering process from a left view to a right view. The pixels of the image regions that cannot be rendered are set to black as shown at 14.

It becomes obvious that the transmitted views, i.e. left and right views in FIGS. 2 and 3, have almost the same content for a huge part of the image. Since the depth information 16 and camera parameters 18 are usually transmitted anyway in order to support the rendering at the decoder side, regions 14 that can be rendered by renderer 20 from one transmitted view, such as the left view in FIG. 3, to another transmitted view, such as the right view in FIG. 3, only need to be transmitted in the bitstream once. Thus, conceptually, if picture regions that can efficiently be rendered from one view to another, all regions of the right view except regions 14, are only transmitted once, a significant amount of the overall bit rate can be saved.

However, even the non-transmission of renderable portions of secondary transmitted views being renderable from primary transmitted views does not lead to an optimally efficient compression of the multi-view data. Accordingly, it would be favorable to have a multi-view concept at hand which enables a more efficient coding of transmitted views.

SUMMARY

According to an embodiment, an encoder for encoding a multi-view signal into a data stream may have: a determinator configured to determine a renderable portion of a first view of the multi-view signal which is renderable, by view synthesis, from a second view of the multi-view signal; a view predictor configured to perform a block-based prediction of the first view using first prediction parameters within the renderable portion, and using second prediction parameters within a non-renderable portion of the multi-view signal disjoint to the renderable portion of the first view, from a respective previously encoded portion of the multi-view signal so as to obtain a prediction signal; a residual generator configured to determine, external to the renderable portion, a residual signal between the prediction signal and the multi-view signal; a parameter predictor configured to predict the second prediction parameters from the first prediction parameters so as to obtain a parameter prediction residual; and a data stream generator configured to insert the parameter prediction residual into the data stream.

According to another embodiment, a decoder for reconstructing a multi-view signal from a data stream may have: a data stream extractor configured to extract prediction parameters, a residual signal and a rendering flag from the data stream; a view predictor configured to perform a block-based prediction of the multi-view signal from a previously reconstructed portion of the multi-view signal based on the prediction parameters so as to obtain a prediction signal, a reconstructor configured to reconstruct the multi-view signal based on the residual signal and the prediction signal, wherein the decoder is configured to assume a first coding mode or a second coding mode depending on the rendering flag, wherein the decoder is configured to, in the first coding mode, render, by view synthesis, at least a portion of a first view of the multi-view signal from a second view of the reconstructed multi-view signal and replace a corresponding portion of the reconstructed multi-view signal by the rendered portion, with not performing the replacement in the second coding mode.

According to still another embodiment, a decoder for reconstructing a multi-view signal from a data stream may have: a data stream extractor configured to extract prediction parameters, a residual signal and a rendering flag from the data stream; a view predictor configured to perform a block-based prediction of the multi-view signal from a reference signal derived from a previously reconstructed portion of the multi-view signal, based on the prediction parameters so as to obtain a prediction signal; a reconstructor configured to reconstruct the multi-view signal based on the residual signal and the prediction signal, wherein the decoder is configured to enter a first or second coding mode depending on the rendering flag, wherein the decoder is configured to determine a renderable portion of a first view of the multi-view signal which is renderable, by view synthesis, from a second view of the previously reconstructed portion of the multi-view signal with the decoder being configured to process blocks within the renderable portion differently in the first coding mode compared to the second coding mode.

According to another embodiment, a method for encoding a multi-view signal into a data stream may have the steps of: determining a renderable portion of a first view of the multi-view signal which is renderable, by view synthesis, from a second view of the multi-view signal; performing a block-based prediction of the first view using first prediction parameters within the renderable portion, and using second prediction parameters within a non-renderable portion of the multi-view signal disjoint to the renderable portion of the first view, from a respective previously encoded portion of the multi-view signal so as to obtain a prediction signal; determining, external to the renderable portion, a residual signal between the prediction signal and the multi-view signal; predicting the second prediction parameters from the first prediction parameters so as to obtain a parameter prediction residual; and inserting the parameter prediction residual into the data stream.

According to another embodiment, a method for reconstructing a multi-view signal from a data stream may have the steps of: extracting prediction parameters, a residual signal and a rendering flag from the data stream; performing a block-based prediction of the multi-view signal from a previously reconstructed portion of the multi-view signal based on the prediction parameters so as to obtain a prediction signal, reconstructing the multi-view signal based on the residual signal and the prediction signal; and assuming a first coding mode or a second coding mode depending on the rendering flag, wherein, in the first coding mode, rendering, by view synthesis, at least a portion of a first view of the multi-view signal from a second view of the reconstructed multi-view signal and replacing a corresponding portion of the reconstructed multi-view signal by the rendered portion takes place, with the replacement not being performed in the second coding mode.

According to still another embodiment, a method for reconstructing a multi-view signal from a data stream may have the steps of: extracting prediction parameters, a residual signal and a rendering flag from the data stream; performing a block-based prediction of the multi-view signal from a reference signal derived from a previously reconstructed portion of the multi-view signal, based on the prediction parameters so as to obtain a prediction signal; reconstructing the multi-view signal based on the residual signal and the prediction signal; determining a renderable portion of a first view of the multi-view signal which is renderable, by view synthesis, from a second view of the previously reconstructed portion of the multi-view signal; and entering a first or second coding mode depending on the rendering flag, wherein the method is processes blocks within the renderable portion differently in the first coding mode compared to the second coding mode.

Another embodiment may have a computer program having a program code for performing, when running on a computer, the above methods.

The basic idea underlying the present invention is that simply disregarding a renderable portion of a first (or dependent) view of a multi-view signal, which is renderable by synthesis from a second (or reference) view of the multi-view signal, introduces new coding penalties due to the lack of information on prediction parameters relating to the renderable portion in the renderable portion, which could serve as a prediction basis for predicting prediction parameters relating to the non-renderable portion of the multi-view signal, i.e. a remaining portion of the multi-view signal disjoint to the renderable portion of the first view. Particularly at the spatio-temporal neighborhood of the renderable portion of the first view, the simple omission of any prediction parameters relating to the renderable portion of the first view would frequently result in a lack of adequate parameter predictors for coding blocks within this neighborhood, both spatially and temporally as well as in inter-view direction as far as further subsequent views in dependency direction are concerned. Accordingly, the prediction parameters of these blocks would have to be transmitted completely anew, thereby causing coding penalties which, to a large extent, compensate the rate savings obtained by omitting the transmission of any data relating to the renderable portion of the first view.

Accordingly, it is an idea of the present invention that an intermediate way of handling the renderable portion of the first view results in a more efficient coding. In particular, instead of omitting the coding of the renderable portion of the first view completely, an even more efficient coding of multi-view signals may be obtained if merely the coding of the residual signal is suppressed within the renderable portion, whereas the prediction parameter coding continues to take place from the non-renderable portion of the multi-view signal across the renderable portion so that prediction parameters relating to the renderable portion may be exploited for predicting prediction parameters relating to the non-renderable portion of the multi-view signal. The additional coding rate which has to be spent for transmitting the prediction parameters relating to the renderable portion may be kept low as the aim of the transmission of these prediction parameters is merely to form a continuation of the prediction parameter history across the renderable portion so as to serve as a basis for prediction parameters of other portions of the multi-view signal. In other words, the prediction parameters relating to the renderable portion do not have to perfectly predict the texture within the renderable portion of the first view so as to keep the residual signal within the renderable portion low.

BRIEF DESCRIPTION OF THE DRAWINGS

Embodiments of the present invention are described in more detail below with respect to the figures, among which.

DETAILED DESCRIPTION OF THE INVENTION

Before describing several embodiments of the present invention with regard to the figures, it should be noted that the same reference signs have been used within these figures for equal elements or elements assuming the same functionality, and accordingly the description of such an element with regard to one figure shall equally apply to another figure.

Figure 4:
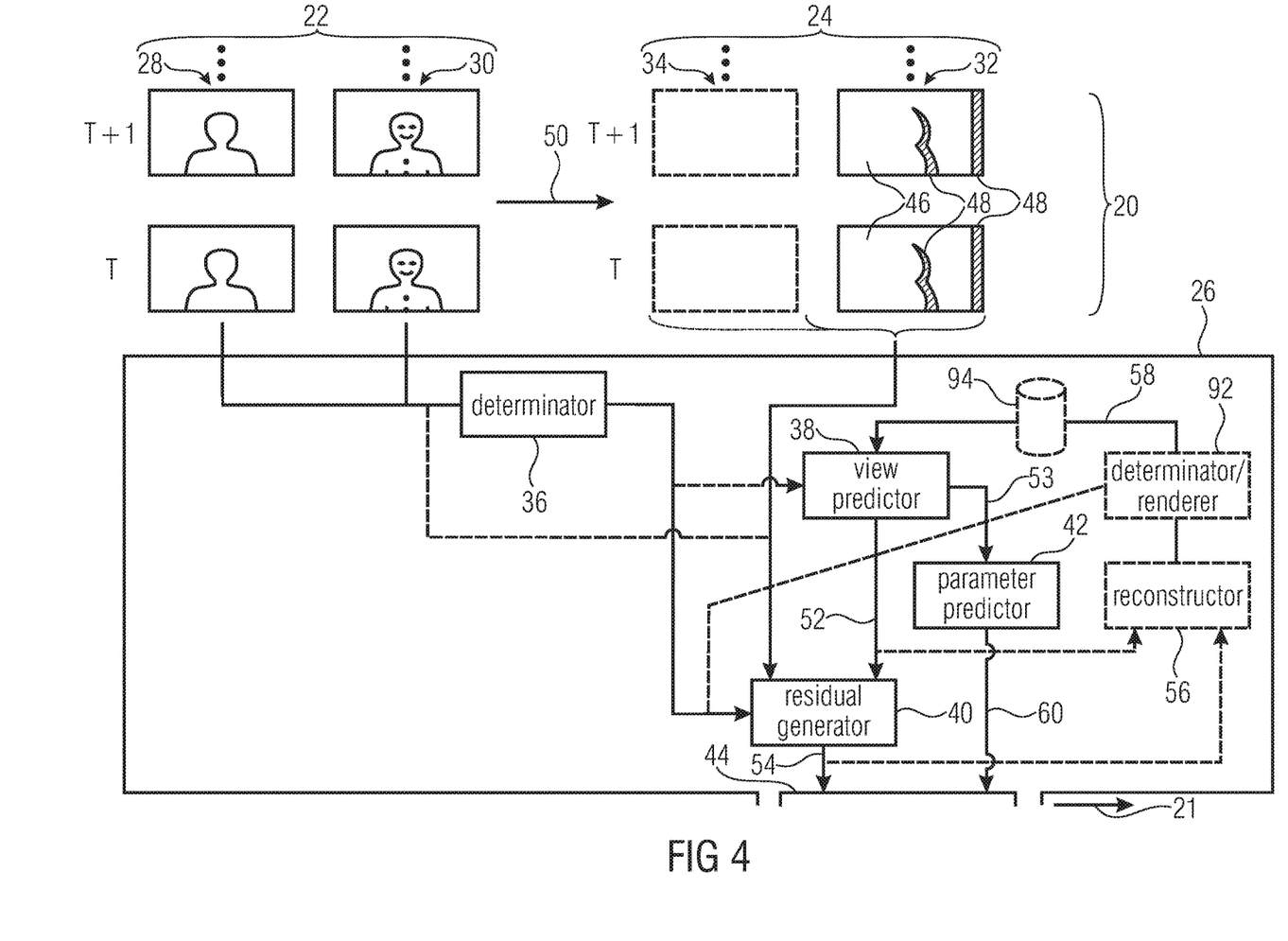
FIG. 4 shows a block diagram of an encoder for encoding a multi-view signal in accordance with an embodiment.

FIG. 4 shows an encoder for encoding a multi-view signal 20 into a data stream 21. As will become clear from the following description, the multi-view signal 20 is exemplarily shown to comprise a first view 22 and a second view 24. However, the embodiments of the present invention are not restricted to such a two-view case and are equally applicable to a case where the number of views of the multi-view signal 20 is higher than two. In any case, the multi-view signal 20 comprises views 22 and 24 which belong to, or relate to, the same scene, but to different view points, and accordingly a high amount of redundancy exists between views 22 and 24 of multi-view signal 20. The encoder of FIG. 4 efficiently removes these redundancies from data stream 21.

Moreover, as will also become clear from the description below, the encoder of FIG. 4 does not necessarily completely encode multi-view signal 20 into data stream 22. Rather, the following description concentrates on the encoding of view 24 into data stream 22 although it should be clear that encoder 26 could generally be configured to encode views 22 and 24 of multi-view signal 20 into data stream 22. Similarly, FIG. 4 exemplarily shows view 22 as comprising a depth/disparity map so as to alleviate the rendering of view 24 from view 22. That is, view 22 is shown to comprise spatially sampled texture information 30, and associated therewith a depth/disparity map 28 representing a spatial sampling of the associated depth/disparity of the scene captured from view 22. It should be noted that view 22 does not have to have a depth/disparity map 28, as will be outlined in more detail below, wherein, however, the existence of the depth/disparity map 28 is of advantage due to the alleviation of the rendering process at the decoder side as will be outlined in more detail below.

As far as the dependent view 24 is concerned, same comprises a spatial sampling 32 of texture of view 24. Merely as an optional feature, view 24 may also comprise depth/disparity map data 34 for associating depth/disparity values to the texture samples of texture 32, just as depth/disparity map 28 does with respect to texture 30.

Further, the multi-view signal 20 may, as shown in FIG. 4, not only represent a spatial sampling of one common scene from different view directions associated with views 22 and 24, but also a temporal sampling of this scene. Accordingly, the texture information 30 and 32 may be videos, i.e. sequences of pictures, and the depth/disparity maps 28 and 34 may have a depth/disparity sample array associated with each picture of videos 30 and 32, respectively. However, although FIG. 4 suggests that a depth/disparity map exists for each picture of the respective view, this is not necessarily the case. In other words, the spatial and/or temporal resolution of the depth/disparity maps 28 and 34, respectively, may differ from the spatial and/or temporal sampling resolution of the associated texture information 30 and 32, respectively. The same applies with respect to the spatial and/or temporal resolution of views 22 and 24: same may be the same among views 22 and 24 or different.

As is shown in FIG. 4, encoder 26 comprises a determinator 36, a view predictor 38, a residual generator 40, a parameter predictor 42 and a data stream generator 44. The interconnection of these blocks is as indicated in FIG. 4 with solid lines. Dashed interconnections and blocks are optional with their significance being derivable from the below-outlined explanation. Regarding the determinator block it is noted that same occurs twice, with both positions however, representing alternative positions to each other so that block 36 may absent when block 92 is present, for example.

The determinator 36 is configured to determine a renderable portion 46 of view 24, which is renderable by view synthesis from view 22 or any other view belonging to the same scene of the multi-view signal. The rendition by view synthesis, which may also called warping, may, for example, involve shifting each sample in view 22, such as each picture sample of video 30 of view 22, in accordance with the co-located value of the depth/disparity map so as to obtain this scene as seen from the view direction of view 24, followed by interpolating the thus obtained rendition result onto the sample grid of view 24, such as the sample positions of video 32 of view 24.

It should be emphasized that determinator 36 may not actually perform the entire rendition. Rather, it is sufficient for determinator 36 to segment view 24 into the renderable portion 46, and the remaining portion, i.e. the non-renderable portion 48. As described above with respect to FIG. 2, the non-renderable portion 48 results from disocclusions and pixel displacements reaching out of the field of view of view 24. For example, usually the disparity displacements of the samples of video 30 do not have a vertical component, but are restricted to a horizontal direction. Accordingly, determinator 36 could be configured to row-wise detect sample positions of view 24, for which no contributing rendered sample from view 22 exists. The actual interpolation would not have to be performed. Even alternatively, determinator 36 could even be configured to detect portions within the depth/disparity map 28 of view 22, which are likely to cause disocclusions due to a transition from foreground to background in the rendering direction 50 from a view point of view 22 to a view point of view 24.

The view predictor 38 is configured to perform a block-based prediction of the multi-view signal from a previously encoded portion of the multi-view signal so as to obtain a prediction signal 52. For example, view predictor 38 subdivides each picture of video 32 and 30, respectively, into blocks and associates respective prediction parameters to these blocks which define how to predict the respective block from a respective previously encoded portion of the multi-view signal 20. The subdivision of pictures of video 32 may differ from the subdivision of pictures of video 30. The subdivision may even vary in time using, for example, a quad-tree subdivision of a regular subdivision of the pictures into tree root blocks. The respective subdivision information is, for example, signaled within data stream 22 via data stream generator 44. The sort of prediction parameters for the blocks may depend on the prediction mode associated with the respective block. For example, the prediction modes may encompass one or more intra prediction modes according to which the respective block is spatially predicted from previously encoded samples neighboring the respective block, one or more inter or temporal prediction modes according to which the respective block is temporally predicted from previously encoded pictures of the same view, and/or one or more inter-view prediction modes according to which the respective block is predicted from a time-aligned picture of another view. In particular, motion compensated prediction may be used for the inter predicted blocks, and disparity compensated prediction may be used for the inter-view predicted blocks. Accordingly, the prediction parameters for inter-predicted blocks may comprise a motion vector indicating the location from where the respective block is to be copied from the reference picture of the same view. A reference index may belong to the motion prediction parameters so as to identify the reference picture among the previously encoded pictures of the same view. Similarly, disparity prediction parameters may comprise a disparity vector and, optionally, a view index.

As far as the coding order used by view predictor 38 is concerned, same may be chosen such that view 22 is coded prior to view 24 as far as one time instant is concerned. Moreover, the coding order may be such that the coding of the multi-view signal 20 steps to the next time instant merely after having completed the coding of the previously encoded time instant. Moreover, the coding order may be such that the time instants are coded into data stream 22 in the presentation time order or in a different order. Finally, it is noted that view predictor 38 could also be responsible for performing the block-based prediction onto the depth/disparity maps 28 and 34, respectively. According to the just-mentioned coding order, it could be that video 30 is coded prior to depth/disparity map 28, followed by view 24. Similar coding modes as described above for the videos 30 and 32 could be available for depth/disparity maps 28 and 34, respectively. Additional coding modes could, however, also be available for blocks of depth/disparity maps 28 and 34 with such coding modes, for example, exploiting the similarity and the location of edges in texture on the one hand and depth information on the other hand.

Although encoder 26 could theoretically use the original version of the previously encoded portion of the multi-view signal as a basis for the prediction, it is of advantage that view predictor 38 bases the prediction on a reconstructible version of the respective previously encoded portion of the multi-view signal as it is depicted in FIG. 4, since in that case a respective view predictor at the decoder side is able to completely recover the prediction signal 52 so that a mismatch between the prediction on the encoder side and the decoder side may be avoided.

The residual generator 40 is configured to determine a residual signal 54 between the prediction signal 52 and the multi-view signal 20. The data stream generator 44 may insert the residual signal 54 into data stream 22. For example, transform coding and/or entropy coding may be used by data stream generator 44.

In order to further reduce the coding rate, parameter predictor 42 predicts prediction parameters based on other prediction parameters. To be more precise, the prediction parameters of a current block are predicted by a parameter predictor 42 based on the prediction parameters of previously encoded blocks of the multi-view signal 20. For example, parameter predictor 42 predicts the prediction parameters of a current block of video 32 based on prediction parameters of a previously encoded spatially neighboring block of the same picture or a co-located block of a previously coded picture of video 32.

The usage of the reconstructed version of the previously encoded portion of the multi-view signal 20 instead of the original version thereof is shown in FIG. 4 by encoder 26 optionally comprising a reconstructor 56, which recovers the reconstructible version 58 of the previously encoded portion of the multi-view signal 20, as reconstructible at the decoder side from the prediction parameters 52 and the residual signal 54 as transmitted via data stream 22.

In order to effectively encode the multi-view signal 20, the encoder 26 is configured such that the view predictor 38 continues to perform the prediction even across the renderable portion 46, with the data stream generator 44 inserting the parameter prediction residual 60 into data stream 22. The residual coder, however, skips residual generation within the renderable portion 16. By this measure, the parameter predictor 42 is able to effectively perform the parameter prediction even across the boundary between the non-renderable portion 48 and the renderable portion 46 of view 24, while spending coding rate for residual coding within the renderable portion is avoided. For example, view predictor 38 may perform the block-based prediction using first prediction parameters within the renderable portion 46, and using second prediction parameters within the non-renderable portion, and the parameter predictor 42 may be configured to predict the second prediction parameters from the first prediction parameters so as to obtain respective parameter prediction residual 60 for insertion into the data stream by data stream generator 44. By this measure the coding rate for coding the second prediction parameters is reduced relative to the case where no first prediction parameters would be available for the decoder. Rather, information of the first prediction parameters, i.e. the prediction parameters used by predictor 38 within the renderable portion 46, would be transmitted via bitstream 22 such as, for example, by predictive coding using parameter predictor 42. In any case, the data stream 22 would have information on the first prediction parameters used within the renderable portion 46 so that, at the decoder side, these prediction parameters may be recovered for the renderable portion.

For example, the view predictor 38 may be configured to, in performing the block-based prediction, predict at least one first block within the renderable portion 46 using first motion or disparity vector data, and at least one second block within the non-renderable portion 48 using second motion or disparity vector data, and the parameter predictor 42 would be configured to predict the second motion or disparity vector data from the first motion or disparity vector data. In this regard, the first block and the second block may both belong to the same picture of the first view 24 or may both belong to the same time instant, or the first block and the second block may be within different pictures of the first view 24. However, it could also be that the second block is a block of a third view of the multi-view signal 20, such as a block belonging to the same time instant as the first block of the renderable portion 46 of view 24, with the third view, however, following in view coding order defined among the views of multi-view signal 20.

As will be outlined in more detail below, the option shown in FIG. 4, according to which reconstructor 56 is configured to reconstruct the first view 24, including the renderable portion 46, from the prediction signal 52 (and the residual signal 54 as far as the non-renderable portion 48 is concerned), and the view predictor 38 performs the block-based prediction from the resulting reference signal 58, is merely one possible option. The rendering result of the renderable portion 46 could also be introduced into the prediction loop as will be outlined in more detail below. Before this, however, an embodiment of a decoder is described in more detail below, the decoder being able to decode data stream 21. As will become clear from this description, the lack of the residual signal within data stream 22 as far as the renderable portion 46 is concerned, does not negatively influence the quality of the reproduced view 24 at the decoder side as the decoder is able to render this portion 46 from the reconstructed version of view 22, which in turn is coded into data stream 22 along with the residual signal 54, thereby resulting in an appropriate quality of the view synthesis in view 24.

Figure 5:
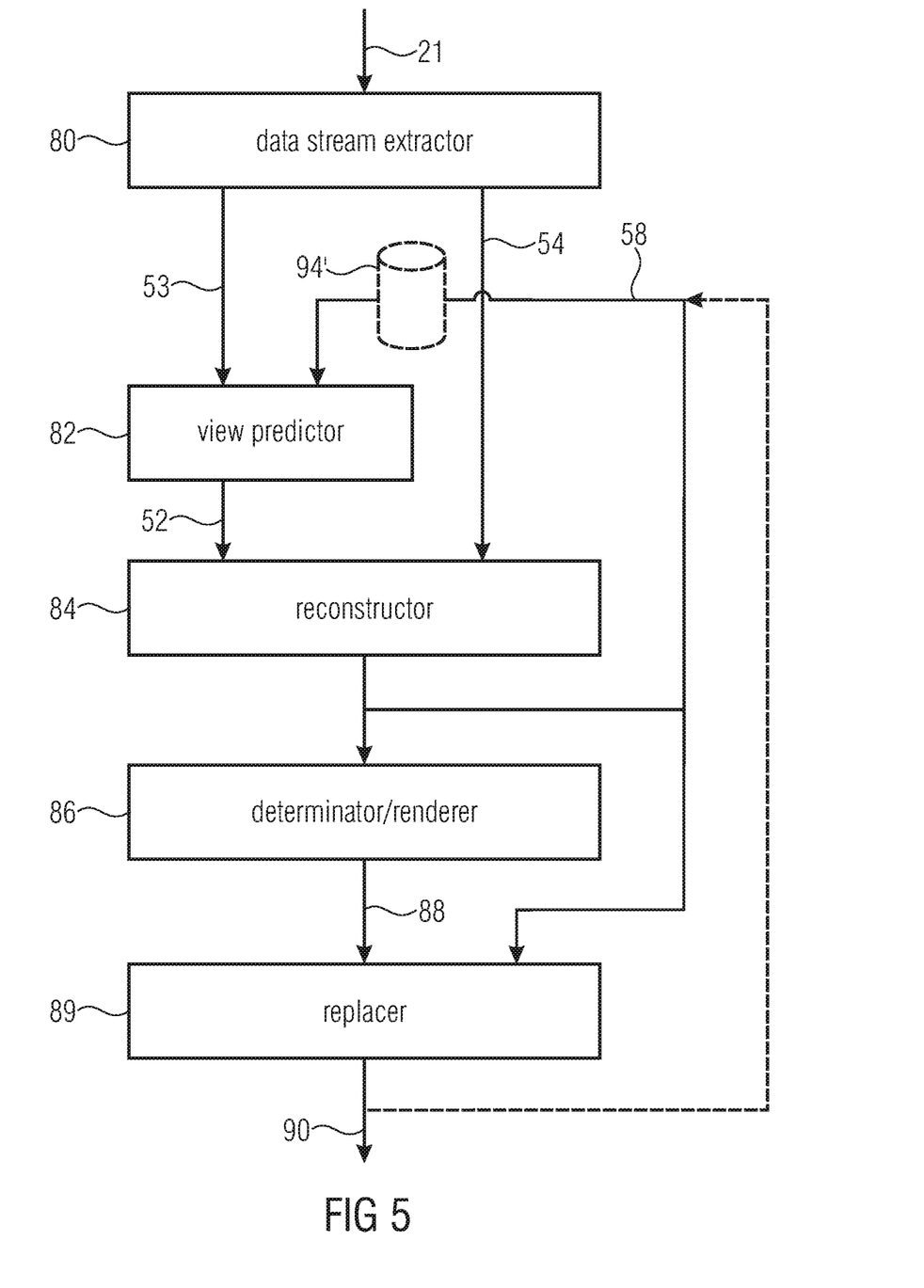
FIG. 5 shows a block diagram of an decoder for reconstructing a multi-view signal in accordance with an embodiment.

FIG. 5 shows such a decoder in accordance with an embodiment. The decoder of FIG. 5 is configured to reconstruct the first view 24 of the multi-view signal 20 from the data stream 22. Again, the decoder of FIG. 5 could also be configured to reconstruct view 22, but FIG. 5 concentrates on view 24.

The decoder of FIG. 5 comprises a data stream extractor 80, a view predictor 82, a reconstructor 84, a renderer 86 and a replacer 88. The interconnection of these blocks is as indicated in FIG. 5 with solid lines. Dashed interconnections are optional with their significance being derivable from the below-outlined explanation.

The data stream extractor 80 is configured to extract prediction parameters 53 and a residual signal 54 from data stream 22. The extraction of the prediction parameters 53 may involve predictive decoding using previously extracted or previously decoded prediction parameters. In other words, data stream extractor 80 may also incorporate a functionality which recovers the prediction parameters 53 from the prediction parameter residuals 60 within data stream 22, namely by predicting the prediction parameters from previously prediction parameters and refining the predicted prediction parameters by use of the prediction parameter residual 60.

The functionality of the view predictor 82 and the reconstructor 84 is to emulate the operation of view predictor 38 and reconstructor 46 of encoder 26 of FIG. 4. That is, view predictor 82 performs a block-based prediction of the multi-view signal from a previously reconstructed portion 58 of the multi-view signal so as to obtain the prediction signal 52 and the reconstructor 84 is configured to reconstruct the multi-view signal 22 using the prediction signal 52 and the residual signal 54 so as to obtain a reconstructed version of the multi-view signal as obtained without rendering. A presentation of the reconstructed version 58 would result in a poor quality of the multi-view signal within the renderable portion 46. Accordingly, renderer 86 is configured to actually perform the rendering of the renderable portion 46 of the first view 24 from the reconstructed version of view 22. The rendering results in a rendered version 88 of the renderable portion 46 and replacer 89 is configured to replace the renderable portion 46 of the reconstructed version of the first view 24 as obtained by reconstructor 84 by this rendered version 88 so as to obtain a finally reconstructed version 90 of the multi-view signal. Thus, the finally reconstructed version 90 does not suffer from the omission of the residual signal within bitstream 21 as far the renderable portion 46 is concerned, since this renderable portion 46 is rendered from the other view 22 anyway.

Summarizing the above embodiments for an encoder and a corresponding decoder, the data stream 21 according to the above embodiments comprises: 1) residual data for the non-renderable portion 48; 2) prediction parameters for both blocks within the renderable portion as well as blocks within the non-renderable portion 48; 3) optionally, subdivision information for subdividing the views into the blocks, 4) optionally, coding modes associated with the blocks and determining the sort of prediction parameters associated with the respective block. Regarding the prediction parameters, same are at least partially predictively coded into the data stream in the form of prediction parameter residuals. At least some of the prediction parameters relating to blocks within the non-renderable portion are coded into the data stream by way of prediction parameter residuals relative to prediction parameters relating to the renderable portion 46. Naturally, some of the prediction parameters of the non-renderable portion may also be coded into the data stream as prediction parameter residuals relative to prediction parameters relating also to the non-renderable portion 48. Similarly, some of the prediction parameters concerning the renderable portion 46 may be coded into the data stream in the from of a prediction parameter residuals relative to prediction parameters of other blocks within the renderable portion 46.

After having described, rather generally, embodiments of the present invention, some possible variations are described below. For example, as has already been described above, the view predictor 38 could alternatively perform the block based prediction from the original version of the previously encoded portion of the multi-view signal 20. However, the reconstructible version 58 is of advantage. Similarly, although FIG. 4 suggests that determinator 36 derives the position of the renderable portion 46 of view 24 based on the original version of view 22, this is merely one option and it is of advantage that determinator 36 performs the determination based on the reconstructible version of view 22 as contained within reference signal 58. This is illustrated by the dashed box 92 in FIG. 4.

Further, in the example of FIG. 4, the reference signal 58, from which view predictor 38 performed the block-based prediction, i.e. the motion compensated and/or the disparity compensated copying, was merely defined by the reconstruction result derived by constructor 56, i.e. the reconstructed version of multi-view signal 20 as currently reconstructed. However, even versions rendered therefrom may contribute to the reference signal based on which view predictor 38 performs the block-based prediction. In accordance with a first alternative, for example, the determinator 92 is configured to actually render the renderable portion 46 to obtain a rendered signal. The rendered signal within the renderable portion forms, along with the reconstructed signal within the non-renderable portion 48, a reference signal based on which the view predictor performs the block-based prediction. That is, in a decoded picture buffer 94, optionally positioned between renderer 92 and view predictor 38, the reference pictures stored therein would correspond to the reconstructed version as reconstructed by reconstructor 56 as far as the non-renderable portion 48 within these pictures is concerned, and the rendered signal as rendered by renderer 92 as far as the renderable portion 46 within these pictures is concerned. That is, the motion- and/or disparity-compensated prediction performed by view predictor 38 would be performed on reference pictures corresponding to those reproduced at the decoding side. A decoded picture buffer 94' may likewise be present in the prediction loop in the decoder right in front of the prediction loop input of the view predictor 82, with same being filled in exactly the same manner as at the encoder in the way set out hereinafter for further embodiments.

In accordance with an even further alternative, the determinator 92 may be configured to actually render the renderable portion to obtain a rendered signal from the reconstructed version of view 22, and the decoded picture buffer 94 would buffer two kinds of reference signals, namely the reference signal as obtained by reconstructor 56 having the non-renderable as well as renderable portions reconstructed using the prediction signal 52 and residual signal 54, and a further reference signal in form of the rendered signal within the renderable portion 46. Thus, different reference indices for the motion- and/or disparity-compensation predicted blocks would refer to different kinds of pictures, namely pictures as output by reconstructor 46 on the one hand, and pictures being rendered at the renderable portion 46 on the other hand.

In accordance with an even further alternative, the determinator 92 may be configured to actually render the renderable portion to obtain a rendered signal from the reconstructed version of view 22 for specific blocks for which the reconstruction based on rendering from view 22 is activated by a respective coding mode option whereas other blocks are reconstructed based on the reconstruction result of reconstructor 56. After having described different embodiments of the present invention, further possible variations and further details regarding the encoding procedure are set out below.

First, it should be emphasized that it is possible to implement the above-described embodiments in such a way that existing multi-view decoders would not realize the above-described way of handling the coding within the renderable portion and the omission of merely the residual signal. Imagine, for example, an existing decoder comprising only blocks 80, 82 and 84 of FIG. 5, i.e. without a renderer and replacer. Nevertheless, such a decoder would be able to reconstruct a multi-view signal although the quality of the reconstruction would be poor within the renderable portion. Moreover, imagine an existing encoder/decoder concept where the decoder is implemented in accordance with FIG. 5, but with the encoder leaving out the encoding of the renderable portion completely. Changing the encoder to operate according to FIG. 4 would be transparent for the decoder as long as the replacing function of replacer 89 is implemented in that decoder. The replacing function, however, would be advantageous anyway as it normally occurs that the boundary between renderable and non-renderable portions crosses some of the blocks of the views, and accordingly in these blocks some replacing function would have to be present anyway.

Thus, in accordance with one implementation possibility, only the encoding algorithm is modified in order to reduce the bit rate that is associated with regions in a dependent view 24 that can be rendered given the reconstructed pictures and depth maps of one or more already coded views 22. A particular feature of this possibility is that the decoding algorithm is not changed relative to conventional multi-view coding (with or without inter-view prediction). The decoder reconstructs the blocks that can be rendered by conventional block-based motion compensation. And this reconstruction signal is also used when these blocks are referenced by future frames for the purpose of motion compensation.

Further, according to the possible implementation of the embodiments outlined above, a more detailed description is spent on the possible way to signal within the data stream 21 the omission of the residual signal within the renderable portion 46. As will be outlined in more detail below, the prediction modes for the blocks may signal to the decoder that a residual signal for the respective block is missing or not. In that case, based on the coded depth maps of the reference view 22 and the coded camera parameters, which may be additionally coded as an optional element 5) in data stream 21, the encoder 26 (or determinator 92) determines regions 46 in the currently coded image at time instance T that can be rendered from images of any previously coded reference view 22 of the same time instance T. In order to determine such regions 46, the encoder/determinator can use basically the same procedure that is used in the renderer 86 for determining the regions that are rendered from a particular view.

For the regions 46 that can be rendered, no residual information is coded. I.e., for these regions 46, the coded block flags or coded block pattern, which indicates whether non-zero transform coefficient levels are present, is switched off, such as set to zero at the encoder side. However, splitting information for the prediction tree (which signal how a block is decomposed for the purpose of temporal or inter-view prediction) and motion data may still be transmitted for these regions, in order not to break the chain of motion data prediction. As described above, when the motion information would be skipped or zero motion vectors would be transmitted for these regions, a significant amount of bit rate would have to be spent for transmitting the motion data of the next block that lies in a region 48 that cannot be rendered. There would not be any suitable motion data in spatially or temporally neighboring blocks that can be used for efficiently predicting the motion data of the next block that cannot be rendered. By also transmitting the motion data of blocks that can be rendered (perhaps with less accuracy, as described below), this can be prevented and overall bit rate may be saved. Thus, e.g. in block-based hybrid video coding, blocks containing only samples that can be rendered are simply encoded without residual information.

Since regions 46 that are identified to be renderable are coded without residual information, these regions can only be reconstructed in a lower quality. Thus, these regions should be rendered 86 from previously decoded views after decoding. In one embodiment, these regions are identified at the decoder side by using a particular specified algorithm (the same or a similar algorithm that is used in the encoder for identifying these regions) in a renderer 86. In another embodiment of the invention, these regions are indicated in the bitstream, e.g. by transmitted supplemental enhancement information (SEI message).

Thus, as became clear from the just-described implementation possibility, it could be that the omission of a residual signal within data stream 21 is realized at block granularity, i.e. by transmitting coding modes for the blocks of view 24 such that for blocks completely residing within the renderable portion 46, no residual signal information is present within the data stream 21, with this fact being known for the decoder from the respective coding mode. With regard to the other blocks, i.e. blocks partially overlapping at the renderable portion and partially overlapping the non-renderable portion, the residual signal may be transmitted within data stream 21 completely, or merely with respect to that part of these blocks lying within the non-renderable portion 48.

If there are only blocks of a fixed size, the encoding can be simply done as described above. For each block, it can be tested in determinator 36 or 92 whether it can be rendered, and if it can be rendered, no transmission of any residual takes place. However, the video coding algorithm used in FIGS. 4 and 5 may include a mechanism by which a (large) block can either be coded in a particular coding mode with associated motion parameters or it can be split into smaller subblocks and each of these subblocks is transmitted in a particular coding mode. In order to decide whether a block, which cannot be completely but only partly rendered, is split or not, encoders may have to compare any particular cost measure. For example, when using a recursive partitioning, such as quad-tree structures, the RD-costs of different tree-depth need to be compared.

Rendering artifacts have a different impact to the subjective image/video quality perception than coding artifacts. Therefore, distortions introduced by rendering cannot be compared directly to distortions introduced by lossy compression. However, in typical encoders, the coding mode of a block is usually determined by minimizing a distortion measure D or a Lagrangian cost measure D+$\lambda$·R, which weights the distortion D for a coding mode against the associated number of bits R given a Lagrangian multiplier $\lambda$. If the mode decision is based on such a cost measure in encoder 26, only a very low percentage of the blocks would be coded in the inter-view skip mode described above, i.e. the mode with suppression of residual coding, since the distortion would usually be quite high compared to conventional coding modes, although the final rendered result will look fine.

Due to that reason, it is of advantage to modify the distortion calculation in the mode decision process. In one embodiment of the invention, the distortion is calculated by only considering samples that cannot be rendered. For all samples that can be rendered (as determined by the determinator), the sample distortion is that to zero (independent of the coding mode) so that it doesn't have any impact on the overall distortion for a block. Therefore, the distortion of rendered regions is not considered in the mode-decision.

Figure 6:
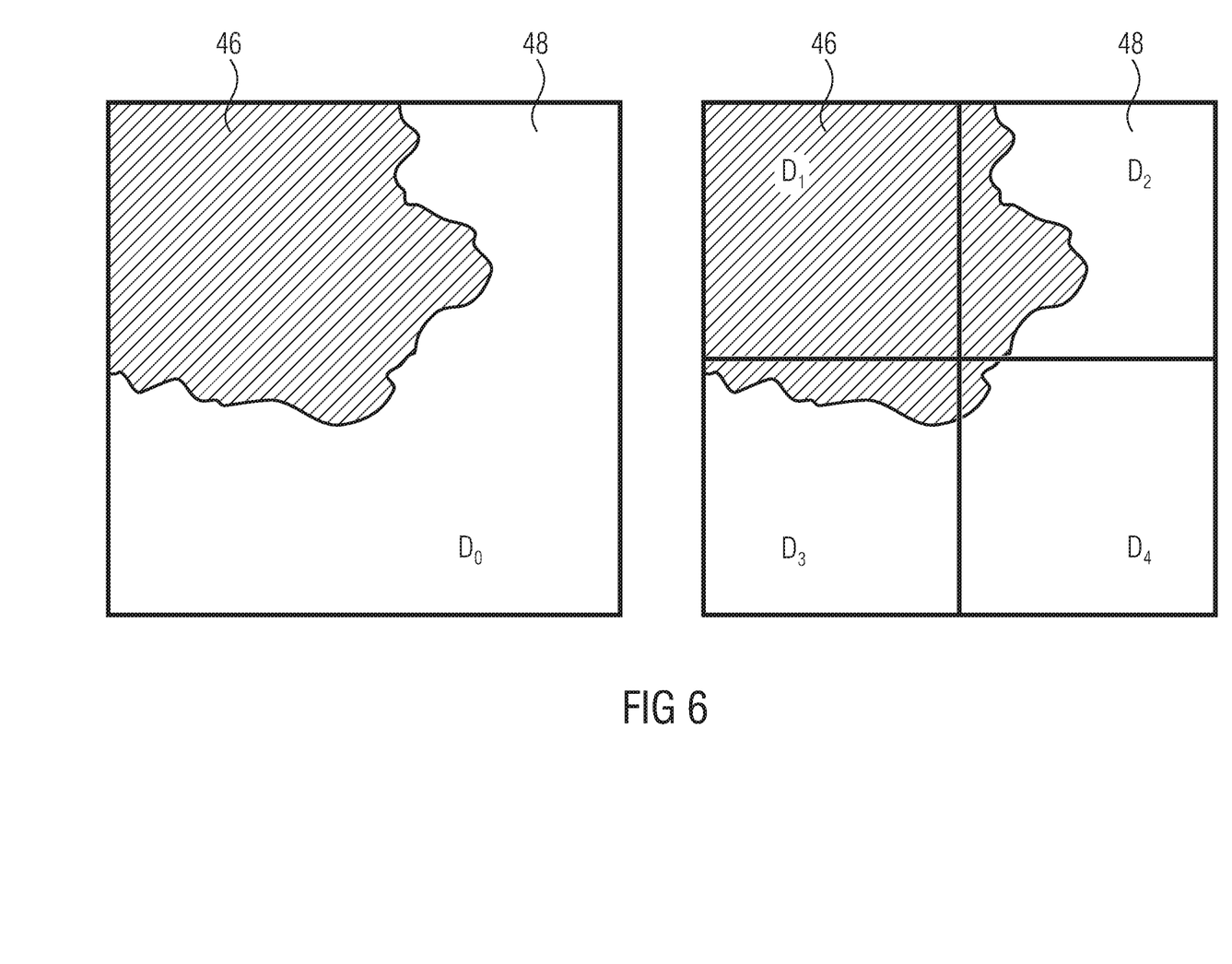
FIG. 6 shows a schematic diagram showing a block to be coded in an un-subdivided state of a hierarchy level of a recursive quad-tree subdivision, and a subdivided state according to a subsequent hierarchy level thereof.

FIG. 6 shows an example: The right image shows the block subdivision that is one level deeper than in the left image. The shaded area labels the samples that can be rendered and are therefore not taken into account. Thus, for example, the upper left block $D_1$ in the right image is not considered at all. And when comparing the cost for the entire block $D_0$ with the sum of the costs for the remaining subblocks $D_1+D_2+D_3$, none of the shaded samples (which can be rendered) is taken into account. By this modification, we do not automatically split blocks for which a subblock can be rendered, but may also code the entire block $D_0$ using a conventional coding mode if this improves the overall coding efficiency.

Thus, the residual generator 40 and the view predictor 38 could be configured to locally vary a block granularity at which the first and second prediction parameters are defined, and at which the residual signal 54 covers the dependent view 24. In that case, both could cooperate to signal the local variation of the block granularity within the data stream 21 in form of the above-mentioned subdivision information. The residual generator and the view predictor could then be configured to perform the local variation at a boundary of the renderable view, such as the block-subdivision of the block $D_0$, using a minimization algorithm so as to minimize a cost measure which increases depending on a distortion measured outside the renderable portion 46, i.e. within portion 48, stronger than on a distortion measured inside the renderable portion 46.

However, even a scaling of $\lambda$ in the Lagrangian cost measure, i.e. the Lagrangian multiplier $\lambda$, could be scaled in the calculation of the RD cost measure within the renderable portion compared to the non-renderable portion.

As described above, for blocks which can be rendered, no transmission any residual information takes place, but splitting and motion information is still transmitted in order to improve the overall coding efficiency for the motion parameters (see above). These motion parameters are, however, only necessitated for obtaining a suitable prediction for the motion parameters of following blocks, which cannot be rendered completely. It is usually justified that these splitting and motion parameter are coded with less accuracy. I.e., when selecting the splitting and motion parameters, the associated rate R should have a larger influence on the selected parameters than for conventionally coded blocks. Or in other words, since the content of the regions 46 that can be rendered is already present in the bitstream (in a different view), these regions do not have to be encoded in a high quality and the calculation of R-D costs may be adapted towards a weaker influence of the distortion term. This forces the mode decision to modes of lower bit rate. Due to that reason, the calculation of the RD-costs is changed from C=D+$\lambda$R (with R being the rate, D being the distortion and $\lambda$ being the Lagrange Multiplier) to C=D+s$\lambda$R. The Lagrange Multiplier $\lambda$ is scaled by a factor s>1.

That is, the encoder 26 may be configured to set prediction parameters relating to the renderable portion 46 using a minimization algorithm so as to minimize a first cost measure, and set prediction parameters relating to the non-renderable portion 48 using the minimization algorithm so as to minimize a second cost measure, wherein a quotient of a strength of an increase of the first cost measure depending on bit rate, divided by a strength of an increase of the first cost measure depending on distortion is greater than for the second cost measure. In the example presented above, the quotient would be s$\lambda$ within the renderable portion, and $\lambda$ within the non-renderable portion.

As described above, it could be possible to include the actually rendered signal into the prediction loop so as to form the prediction basis for view predictor 38. However, the decision whether the renderable portion 46 is included into the prediction loop or not, could be performed on a block basis as described further below. In particular, in accordance with this embodiment, the inter-view skip mode could be realized by signaling the rendered region and integrating the rendering into the prediction loop via renderer 92. The bitstream syntax and the decoding process are modified. In contrast to above embodiments, it is signaled inside the bitstream whether a block is rendered based on data coded in an already coded view 22 and, for these blocks, the reconstructed signal or reference signal 58 entering view predictor 38 is obtained by actually rendering these blocks inside the decoder loop within renderer 92. Consequently, the rendered blocks are also used when these blocks are referenced by future frames for the purpose of motion compensation. That is, their content is rendered when copied to another block.

Thus, based on the coded depth maps of the reference view 22 and the coded camera parameters, the encoder/determinator determines regions 46 in the currently coded image of view 24 at time instance T that can be rendered from images of previously coded reference view 22 of the same time instance T. This process is the same as described above. But additionally, for particular blocks in the prediction tree of the currently coded image of view 24 a flag is transmitted inside the bitstream, indicating whether the block can be rendered or not. For those blocks that can be rendered, no residual information is transmitted. The flag could be transmitted for all blocks that are coded using motion (or disparity) compensation. In another embodiment, the flag is only transmitted for a subset of the blocks (for example only blocks with a block size larger than or equal to a particular block size); for all other blocks, the flag may be inferred to be equal to 0 (i.e., these blocks are coded using conventional coding mode).

The reconstruction of these partitions is obtained by the particular rendering algorithm in renderer 92. If such a rendered block is used for motion-compensated prediction of other blocks in following frames of view 24, for example, the rendered reconstruction signal is used.

In one embodiment, the described possibility, in which a flag signals whether a block is rendered and the reconstruction signal is obtained by actually rendering the blocks, is combined with the modified encoder control described above.

However, the explicit signaling whether a certain block within the renderable portion 46 is to be replaced within the prediction loop by the rendered signal does not need to be transmitted explicitly. Rather, as described above this replacement may be contacted automatically based on the determined location of the renderable portion 46. Thus, the inter-view skip mode may be realized by integrating rendering into the prediction loop, but without transmitting block-based rendering information. In that case, the bitstream syntax does not include a block-based indication whether a respective block is rendered or not, but the decoding process is modified in a way that the reconstruction signal of blocks that can be rendered is obtained by actual rendering. This method is in principle similar to the just-described possibility of signaling block-wise the insertion of the rendered version or reconstructed version into the prediction loop, but no flags are transmitted that indicate if the region can be rendered. Instead, the decoder checks renderability itself using the received depth maps and camera parameters the same way as the encoder does, and for renderable blocks the use of the rendered version from the reference version is used by default.

Based on the coded depth maps of the reference view 22 and the coded camera parameters, the encoder/determiner determines regions 46 in the currently coded image of view 24 that can be rendered from images of previously coded reference view 22 of the same time instance. For those regions 46, no further residual information is transmitted. The reconstruction of these regions is obtained by rendering. In one embodiment of the invention, this method is combined with a modified encoder control as described above.

Based on the decoded depth maps of the reference views and the decoded camera parameters, the decoder/renderer 86 determines regions in the currently decoded image that can be rendered from images of previously decoded reference views of the same time instance. The reconstruction of these regions is obtained by rendering. The algorithm that is used for determining the regions that can be rendered is the same in encoder in decoder, so that no encoder-decoder mismatches can occur if the bitstream is transmitted without errors.

As already described above, a kind of warped inter-view prediction may be realized. For reducing the bit rate associated with blocks in view 24 that can be rendered based on the pictures and depth of an already coded reference view 22, new rendered reference pictures may be introduced and buffered in buffer 94. An image is created by rendering the current view 24 using the reconstructed image of one or more reference views 22 and the associated depth maps 28. For that purpose, the images of an already coded view 22 are mapped to the coordinate system of the current view by using the associated depth maps by renderer 22. The newly created image represents a suitable representation for the current image of the current view 24, except for the areas 48 that are uncovered in the current view 24, or are not present in the reference views such as the border area illustrated to the right of texture 32. During the rendering process, the holes in the rendered image can be either set to a particular values or can be filled by particular algorithms, e.g., by setting the samples equal to the sample values of the neighboring samples with the smallest depth value, a procedure called background filling.

In one embodiment, a single rendered image may be created based on the data of all previously coded views (for the current time instance) or a subset of the previously coded views. In another embodiment of the invention, a rendered image is created by using exactly one previously coded view. However, if more than one view has already been coded, two or more rendered images can be created. In another embodiment, a rendered image can be created by using the data of exactly one view or by using the data of more than one view. It can be signaled inside the data stream, which data are used for creating a particular rendered image.

In one embodiment, the rendered images may replace the interview reference picture for the same reference view in the reference picture lists of the current picture. In another embodiment, both conventional interview reference pictures and rendered pictures that are rendered using the reconstructed pictures and depths maps of already coded views can be presents in the reference picture lists or lists for the current picture. What reference pictures are actually included in the reference picture list(s) may be signaled inside the data stream.

In one embodiment, the low-level syntax is not modified, i.e., only the generation of the reference picture list is changed (including the creation of rendered reference pictures). The advantage of this method is that, when an interview reference picture is used (as signaled by the reference picture index), the associated motion parameters are zero or at least nearly zero (since the reference view image has been mapped to the coordinates of the current view) and the bit rate associated with the motion data is very small. In order to further reduce the bit rate associated with regions that can be rendered, the encoder control can be modified in a similar way as described above. That means, for block that can be rendered (as determined by the encoder), the encoder can set the reference index to a value that indicates the usage of a rendered reference picture. In addition, the residual information can be set to zero (i.e., no residual is coded for a rendered block). Also, the motion vector can be set to zero. Furthermore, the cost measure for deciding the coding mode for a block that can be rendered can be modified by multiplying the Lagrangian parameter with a scaling factor greater than 1. Also, during mode decision, the distortion measure can be modified in a way that only samples that cannot be rendered contribute to the distortion.

In another embodiment, the motion vector differences, i.e. the prediction parameter residual, are not transmitted but inferred to be equal to 0 if the reference index indicates that a rendered reference image is used (but the residual can be transmitted). In a further embodiment, no residual and no coded block indication is transmitted if the reference index indicates that a rendered reference image is used (but motion vector differences can be transmitted). Instead, the coded block information is inferred to be zero (i.e., the corresponding residual is inferred to be zero). In another embodiment, no motion vector differences and no residual are transmitted if the reference index indicates that a rendered reference image is used.

In another embodiment, the concept of rendered pictures is not (or not only) applied to the coding of texture information (i.e., normal video signals), but it is applied to the coding of depth maps. In this case, the disocclusion areas of the rendered reference images can be filled with the background depth (i.e., the depth value that specifies the farthest distance to the camera of the samples at the border of the disocclusion area). This hole filling can be applied line-wise (by considering only samples in the same line as the hole sample to be filled) or region-wise (by considering all samples at the borders of the disocclusion area).

After having described many different implementation possibilities, it should be noted that it became clear from the above discussion that renderer 86 within the decoder may not completely render all the renderable portion 46. Rather, block 86 may act as a determinator for determining the renderable portion with rendering portions thereof signaled within the data stream 21.

Finally, it is noted that the embodiments described so far largely rely on a consistency between the determination of the renderable portion (its location) at the encoder and decoder. A mismatch between the determination at the encoder and decoder could lead to unwanted quality degradations. Accordingly, in accordance with an embodiment of the present application, the encoder signals within data stream 21 as an optional element 6) a rendering flag that signals that the decoder shall use the agreed rendering process in determinator/renderer 86 in order to determine the renderable portion and perform the rendering. Thus, the decoder in FIG. 5 could have the data stream extractor 80 for extracting the prediction parameters, the residual signal and a rendering flag from the data stream 21. The view predictor 82 would perform the block-based prediction of the multi-view signal from a previously reconstructed portion of the multi-view signal based on the prediction parameters so as to obtain a prediction signal, and the reconstructor 84 would reconstruct the multi-view signal based on the residual signal and the prediction signal. However, the decoder would be responsive to the rendering flag so as to enter a predetermined coding mode in case of the rendering flag assuming a predetermined state. In this predetermined coding mode, the renderer 86 renders, by view synthesis, at least a portion out of the renderable portion 46 of the multi-view signal, when this portion replaces a corresponding portion of the reconstructed multi-view signal. If the rendering flag does not assume the predetermined value, this replacement in the rendering does not take place.

Moreover, the rendering flag may signal to the decoder that the prediction parameters in the residual signal are to be interpreted differently in case of the rendering flag having the predetermined state relative to the case where the rendering flag does not have this predetermined state. For example, an extra signalization of whether a respective block is to be inserted into the decoded picture buffer in form of its rendered signal, or in form of its reconstructed signal as described above, is only reasonable for blocks within the renderable portion. For blocks within the non-renderable portion, the possibility of using the rendered signal is not available anyway. Accordingly, the decoder could be configured such that in the coding mode activated by the rendering flag, view predictor and reconstructor act differently for blocks lying within the renderable portion. That is, same would divide-up the blocks into ones positioned within the renderable portion, and ones positioned within the non-renderable portion. For example, the decoder could be configured such that for the blocks within the renderable portion, a coding option according to which a rendering of the respective block from the second view 24 as performed by renderer 86 replaces—as performed by replacer 89—a corresponding portion of the reconstructed multi-view signal so as to participate in a presentation output 90 of the decoder and/or the reference signal which enters the view predictor 82—via the dashed line in FIG. 5—is available in the first coding mode but not in the second coding mode. Thereby, side information transmission rate may by reduced due to less possible states of the coding option identifiers for the blocks in the renderable portion.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed:

1. A decoder for reconstructing a multi-view signal from a data stream, the decoder comprising:
   a data stream extractor configured to extract, using a processor, from the data stream, a rendering flag, a prediction parameter and a residual signal related only to a non-renderable portion of a first view of the multi-view signal, wherein the non-renderable portion of the first view is disjoint from a renderable portion of the first view and the rendering flag is associated with the renderable portion of the first view, indicative of whether the renderable portion is to be replaced with a rendered portion generated, by view synthesis, based on a second view of the multi-view signal;
   a view predictor configured to perform, using the processor, a block-based prediction of a block of the non-renderable portion of the first view based on the prediction parameter and a reference signal derived from a previously-reconstructed portion of the multi-view signal to acquire a prediction signal; and
   a reconstructor configured to reconstruct, using the processor, at least a portion of the first view based on the residual signal and the prediction signal.

2. The decoder according to claim 1, wherein, based on the rendering flag, the decoder is configured to render, by view synthesis, the renderable portion of the first view from the second view to generate the rendered portion and replace the renderable portion of the reconstructed multi-view signal by the rendered portion.

3. The decoder according to claim 1, further comprising a determinator configured to determine the renderable portion of the first view using a depth map of a scene to which the first and second views belong.

4. The decoder according to claim 1, wherein the view predictor is configured to, in performing the block-based prediction, predict the block within the non-renderable portion using, as the prediction parameter, a motion vector or a disparity vector.

5. The decoder according to claim 1, wherein the view predictor is configured to perform the block-based prediction of a block of the renderable portion of the first view using another prediction parameter, wherein the block of the renderable portion and the block of the non-renderable portion are within different pictures of the first view.

6. An encoder for encoding a multi-view signal into a data stream, the encoder comprising:
   a determinator configured to determine a renderable portion of a first view of the multi-view signal which is renderable, by view synthesis, based on a second view of the multi-view signal;
   a view predictor configured to perform, using a processor, a block-based prediction of a block of a non-renderable portion of the first view of the multi-view signal based on a prediction parameter and a previously-encoded portion of the multi-view signal to acquire a prediction signal, wherein the non-renderable portion of the first view is disjoint from the renderable portion of the first view;
   a residual generator configured to determine, using the processor, only with respect to the non-renderable portion, a residual signal based on the prediction signal and the multi-view signal; and
   a data stream generator configured to encode, using the processor, the prediction parameter and the residual signal into the data stream.

7. The encoder according to claim 6, wherein the data stream generator is configured to encode position information indicating a position of the renderable portion into the data stream.

8. The encoder according to claim 6, wherein the determinator is configured to determine the renderable portion of the first view using a depth map of a scene to which the first and second views belong.

9. The encoder according to claim 6, wherein the view predictor is configured to, in performing the block-based prediction, predict the block within the non-renderable portion using, as the prediction parameter, a motion vector or a disparity vector.

10. The encoder according to claim 6, wherein the view predictor is configured to perform the block-based prediction of a block of the renderable portion of the first view using another prediction parameter, wherein the block of the renderable portion and the block of the non-renderable portion are within different pictures of the first view.

11. The encoder according to claim 6, wherein the encoder further comprises: a reconstructor configured to reconstruct the first view, including the renderable portion, from the prediction signal to acquire a reference signal, wherein the view predictor is configured to perform the block-based prediction based on the reference signal.

12. The encoder according to claim 6, wherein the determinator is configured to render the renderable portion to acquire a rendered signal, and the encoder further comprises: a reconstructor configured to reconstruct the non-renderable portion based on a combination of the residual signal and the prediction signal to acquire a reconstructed signal, wherein the reconstructed signal and the rendered signal form a reference signal, which is used by the view predictor to perform the block-based prediction.

13. The encoder according to claim 6, wherein the residual generator and the view predictor are configured to:
   locally vary a block granularity at which the prediction parameter is defined, and at which the residual signal covers the first view, and signal the local variation of the block granularity within the data stream, and
   perform the local variation at a boundary of the renderable view using a minimization algorithm to minimize a cost measure which increases depending on a distortion measured outside the renderable portion stronger than on a distortion measured inside the renderable portion.

14. The encoder according to claim 6, wherein the encoder is configured to set the other prediction parameter for the renderable portion using a minimization algorithm so as to minimize a first cost measure, and set the prediction parameter for the non-renderable portion using the minimization algorithm to minimize a second cost measure, wherein a quotient of a strength of an increase of the first cost measure depending on bitrate divided by a strength of an increase of the first cost measure depending on distortion is greater than for the second cost measure.

15. A non-transitory computer-readable medium for storing data associated with a video, comprising:
   a data stream stored in the non-transitory computer-readable medium, the data stream comprising a rendering flag, a prediction parameter, and a residual signal related only to a non-renderable portion of a first view of the multi-view signal, wherein the non-renderable portion of the first view is disjoint from a renderable portion of the first view and the rendering flag is associated with the renderable portion of the first view, indicative of whether the renderable portion is to be replaced with a rendered portion generated, by view synthesis, based on a second view of the multi-view signal, wherein at least a portion of the first view is reconstructed using a processor configured to execute operations comprising:
   extracting, from the data stream, the prediction parameter and the residual signal;
   performing a block-based prediction of a block of the non-renderable portion of the first view based on the prediction parameter and a reference signal derived from a previously-reconstructed portion of the multi-view signal to acquire a prediction signal; and
   reconstructing the at least portion of the first view based on the residual signal and the prediction signal.

16. The computer-readable medium according to claim 15, wherein the operations comprise, based on the rendering flag, rendering, by view synthesis, the renderable portion of the first view from the second view to generate the rendered portion and replace the renderable portion of the reconstructed multi-view signal by the rendered portion.

17. The computer-readable medium according to claim 15, wherein the operations comprise determining the renderable portion of the first view using a depth map of a scene to which the first and second views belong.

18. The computer-readable medium according to claim 15, wherein the operations comprise, in performing the block-based prediction, predicting the block within the non-renderable portion using, as the prediction parameter, a motion vector or a disparity vector.

19. The computer-readable medium according to claim 15, wherein the operations comprise performing the block-based prediction of a block of the renderable portion of the first view using another prediction parameter, wherein the block of the renderable portion and the block of the non-renderable portion are within different pictures of the first view.

20. The computer-readable medium according to claim 15, wherein the data stream comprises position information indicating a position of the renderable portion.

* * * * *